Patented Aug. 24, 1943

2,327,912

UNITED STATES PATENT OFFICE 2,327,912

DRESSING OF FABRICS AND ARTIFICIAL STRUCTURES

Leon Lilienfeld, deceased, late of Vienna, Germany, by Emerich Hunna, executor, Vienna, Germany; Antonie Lilienfeld, administratrix of said Leon Lilienfeld, deceased, assignor to Lilienfeld Patents Inc., Boston, Mass., a corporation of Massachusetts No Drawing. Application January 17, 1940, Serial No. 314,358. In Great Britain March 14, 1930

31 Claims. (Cl. 117—143)

Statements exist in the prior literature, that the alkyl ethers of cellulose prepared by acting upon alkali cellulose with alkylating agents without extraneous supply of heat, if insoluble in water, are insoluble or only sparingly soluble in aqueous caustic alkali solutions. This inventor conducted all his previous research work, as far as aiming at the preparation of alkyl derivatives of cellulose that are soluble in caustic alkali solutions but not in water, in the heat. Consequently, the processes resulting from this inventor's past researches on this problem and described in U. S. Patent No. 1,589,606 are based upon heating cellulose or its near conversion products or its derivatives with alkylating agents, in the presence of caustic alkali.

The present invention is based on the discovery by this inventor, that it is possible to produce technically highly valuable alkyl derivatives of cellulose which are soluble in aqueous solutions of caustic alkalies, but insoluble or only sparingly soluble in water, by acting upon cellulose or its near conversion products, in the presence of an alkali, with alkylating agents (such for example as dialkyl sulphates, alkyl halides, etc.) without any extraneous supply of heat and, in some cases, even by checking or reducing the evolution of heat occurring in the reaction which is an exothermic one. Such a process produces cellulose ethers which are in some respects better than those produced by the process of Patent 1,589,606, and indeed better than any alkali-soluble cellulose ethers of the prior art.

The process may be carried out in a very simple manner. It consists essentially in treating, without extraneous supply of heat, bleached or unbleached cellulose, or a material containing cellulose, or a near conversion or oxidation product of cellulose with one or more alkylating agents in the presence of an amount of caustic alkali which (reckoned as NaOH) is smaller than the weight of the water present.

The alkali is preferably added by steeping the cellulose in an excess of a solution of caustic alkali and removing the excess of alkali solution by pressing, centrifuging or the like, or (less advantageously) by mixing or kneading the cellulose with the required quantity of caustic alkali solution.

The alkylating agent may be employed in the undiluted state or diluted with a suitable diluent (for example benzol or the like).

The amount of the alkylating agents, for example dialkyl sulphates employed in the present process may be large (for example, one to two— in certain cases even more—molecular proportions of the alkylating agent for each molecular proportion of cellulose reckoned as $C_6H_{10}O_5$) or smaller (for instance 0.2 to 0.8 molecular proportion of the alkylating agent, for example di-alkyl sulphate, to one molecular proportion of cellulose reckoned as $C_6H_{10}O_5$). Very good results are obtained when small or moderate proportions of, say, 0.3 to 1 molecular proportion of the alkylating agent, for example a di-alkyl sulphate, are used for one molecular proportion of cellulose reckoned as $C_6H_{10}O_5$.

The treatment of the cellulose with caustic alkali and with the alkylating agent may be carried out simultaneously, or successively in either order.

The reaction may also be conducted in the presence of a catalyzer, such as a small quantity of a copper salt, or nickel salt or iron salt.

In order to work up the reaction mixture after the reaction is completed, the reaction mixture is either dissolved as such in water (when unused alkali is present in sufficient quantity, or is dissolved in a solution of caustic alkali, and is put to the technical use contemplated, if necessary after previously filtering, straining through cloth or centrifuging, or the final product is isolated, for example, by merely washing the reaction mass with water or other solvent for alkalies and salts (for instance, aqueous alcohol). The washing may also be preceded by neutralization of the alkali present in the reaction mixture, or by acidification of the mixture, particularly when there is present in the mixture a large excess of alkali. The washed alkyl derivative of cellulose may then either be dissolved in a caustic alkali solution or dried. The isolation of the product may also be carried out in the following manner: The reaction mixture is dissolved by the addition of a caustic alkali solution or of water (if enough caustic alkali is present to dissolve the reaction product), the solution is freed if necessary from undissolved constituents by filtering, straining, centrifuging or the like, and then mixed with an acid, an acid salt, or any other substance capable of neutralizing the alkali, such as an ammonium salt, in quantity sufficient to neutralize the alkali, or in excess of this quantity, and the precipitate is thoroughly washed, and, if desired, dried. The drying may also be preceded by a dehydration with alcohol (in which the ethers of this type are insoluble). The compounds isolated by any method may be purified, for example by dissolving in a dilute solution of caustic alkali and precipitating by means of an acid or the like.

When decomposed by boiling with strong hydrohalogen acid (such as hydriodic acid) the alkyl derivatives of cellulose produced according to the present process yield the corresponding alkyl halides.

The processes described in U. S. Patent No. 1,589,606 for the manufacture of alkyl derivatives of cellulose soluble in solutions of caustic alkali, are in many respects surpassed by the process herein described. Moreover, the products, i. e. the alkyl celluloses prepared according to the present process are superior in many respects to the products obtainable by the processes described in that prior patent. The possibility of conducting the process without extraneous supply of heat not only renders it more simple, handy and economical, but also affords a considerable protection of the cellulose molecule against caustic alkalies to which it is particularly sensitive at raised temperatures. The most important advantage, however, lies in the superiority of the cellulose compounds themselves which, in the form of technical products, such as films, threads, coverings or the like possess greater tensile strength and are more flexible, than the alkyl derivatives produced according to said U. S. Patent 1,589,606.

The conversion of the alkyl derivatives of cellulose prepared according to the present invention into artificial structures, for example artificial threads, films, coatings of any kind, dressings for textiles, and the like, is effected, for example, by bringing a solution in caustic alkali solution, of an alkyl derivative of cellulose made in accordance with the present invention, into the form or shape of the desired artificial structure and acting upon the thus shaped solution with a coagulating agent, for example any coagulating bath used in the viscose art. The alkyl derivatives of cellulose produced according to the present invention may be transformed into artificial structures by contacting their shaped solutions with an agent or agents having a coagulating effect on the shaped solution and a plasticizing effect on the freshly coagulated material. As coagulating agents which also function as plasticizing agents, baths containing at least 35 per cent of sulphuric acid monohydrate (for example 50 to about 80 per cent of sulphuric acid monohydrate) are suitable. Baths containing an equivalent amount of another mineral acid, also can be used. The coagulating and plasticizing of the shaped solution may also be effected in two steps by acting upon the shaped solution first with one or more agents which have only a coagulating effect on the shaped solution and then with one or more agents (for example strong mineral acids, particularly strong sulphuric acid) which have a plasticizing effect on the freshly coagulated material.

It is impossible to indicate every condition for success in every particular case, and it is to be understood that preliminary experiments cannot be avoided to find what are the working conditions necessary for success when using a particular kind of cellulose, a particular method of incorporating the alkali with the cellulose and a particular alkylating agent.

The following examples of operations serve as a practical illustration of the invention, which, however, is in no way limited to the examples; the parts are by weight:

*Example 1.*—1000 parts of wood-pulp (moisture 9 to 10 per cent) or 1000 parts of cotton linters (moisture 7 to 8 per cent) are steeped in 20,000 parts of caustic soda solution of 18 per cent strength at 15° C., and the reaction mixture is allowed to stand for 3 hours at room temperature. After this time the alkali cellulose is pressed down to 3400 parts and comminuted in a cooled shredder for 3 hours at 12 to 13° C., whereupon 600 parts of di-methyl sulphate are added in a few portions, and the reaction mass kneaded in the shredder for about 3 hours.

Soon after the addition of the di-methyl sulphate the temperature of the reaction mass rises to about 23° C. and thereafter to about 26–30° C. and is kept at this temperature until the end of the kneading. A sample taken out immediately after the three hours of the kneading shows that the mass has become practically wholly soluble in caustic soda solution (for example of 5 to 10 per cent strength) and that the solution, on being acidified with dilute sulphuric acid, yields a bulky precipitate.

The reaction mass is now transferred to a vessel, provided with a lid and kept in this closed vessel for about 20 hours at 18° C. After that time it is placed on a straining cloth or in a filter press and washed with water until free from alkali, whereupon it is pressed down to about 4 times the weight of the parent cellulose. A sample taken out shows that the washed product of the reaction is readily soluble in dilute caustic soda solution (for example of 10 per cent strength) and also in strong caustic soda solution (for example of 15 to 18 per cent strength). It is then either dried (optionally after having been dehydrated with alcohol and, if desired, extracted with ether), or directly dissolved in such amounts of caustic soda and water as to yield a solution containing, say, 5 per cent of the dry residue of the washed product (in which the water content has been determined) and 8 per cent of NaOH. The solution thus obtained is an excellent viscous solution practically free from undissolved constituents. It may be directly worked up into artificial structures (for example, according to the Examples 15 to 22 given below), or, after being diluted with caustic soda solution of 8 per cent strength, it may, if desired, be freed from any undissolved particles as by filtration or the like, and then precipitated by acidifying with an acid (for example, sulphuric acid).

The precipitate obtained is separated from the mother liquor, washed until free from acid and dried at atmospheric or reduced pressure, if desired after previously dehydrating it with alcohol and washing with ether. After grinding, it is a white powder, insoluble in water, but soluble in dilute caustic alkali solution, for instance, a caustic soda solution of 5 to 8 per cent strength. A solution of the substance in caustic soda solution (for instance of 5 to 10 per cent strength) is clear and viscous and, when spread on a glass plate and treated with a dilute acid or with any precipitating agent known in the viscose industry, yields a clear, tough film which, after washing and drying, is transparent and flexible.

The purified methyl ether of cellulose, upon analysis by the Zeisel method, showed a methyl content of 1.60%. This corresponds to one methyl group per 5.45 $C_6H_{10}O_5$-molecular units of cellulose.

*Example 2.*—The process is conducted as in Example 1, but with the difference that the cooling of the shredder is maintained throughout the whole period of reaction of the di-methyl sulphate and soda cellulose, so that the temperature of the reacting mass is kept throughout the whole time of reaction at 15° C. and that also during the 20 hours of standing after kneading the temperature does not exceed 15° C.

The composition and properties and solubility of the final product are similar to those of the product obtained in Example 1.

*Example 3.*—Mode of procedure as in Example 1 or 2, with the exception that the washing is performed immediately after the kneading step, i. e. three hours after the addition of the di-methyl sulphate.

*Example 4.*—The process is carried out as in any one of the preceding examples, but with the difference that, after the reaction is completed, the reaction mass is not washed, but, after its content in water and NaOH has been determined, directly dissolved in caustic soda solution and the solution thus obtained (if necessary after having been filtered) is employed for technical purposes, or, after having been further diluted with dilute caustic solution and filtered, used for the isolation of the methyl ether of cellulose, for example by the method described in Example 1.

The products of Examples 2, 3 and 4 are essentially the same as the product of Example 1, and have substantially the same methyl content.

*Example 5.*—The process is conducted as in any one of the Examples 1 to 4, with the difference that, instead of 600 parts, only 300 parts of di-methyl sulphate are allowed to act upon the alkali cellulose.

The washed reaction mass is soluble in dilute caustic soda solution of 10 per cent strength with no residue or a slight residue only, so that, in order to isolate the final product in its pure state by precipitation of its solution, in the latter case filtration or centrifuging of the solution is recommended.

The purified methyl ether of cellulose contains about 1.51% of methyl group.

*Example 6.*—The process is conducted as in Example 5, with the exception that, instead of 300 parts, only 100 to 200 parts of di-methyl sulphate are employed. The solution of the crude reaction mass in caustic soda solution of 10 per cent strength contains a small amount of undissolved particles so that it is recommended to carry out the isolation of the pure product (if such be desired) by dissolving the reaction mass in dilute caustic soda solution, filtration and precipitation as described in Example 5.

The thers produced (using respectively 100 or 200 parts of the dimethyl sulphate) will be found (after purification) to contain 0.67% and 1.37% respectively, of the methyl group.

*Example 7.*—The process is conducted as in Example 1, but with the difference that, instead of 600 parts, 1000 parts of di-methyl sulphate are used. The methyl ether of cellulose, produced according to this example after purification, contains 2.96% of methyl radical.

*Example 8.*—The process is conducted as in Example 1, but with the difference that, instead of 600 parts, 1500 parts of di-methyl sulphate are used.

If (in this example) no cooling is applied to the reacting mass, after the addition of the di-methyl sulphate, the temperature rises to 50° to 60° C., but cools within 1 to 2 hours to 18 to 25° C.

The methyl ether of cellulose, produced according to this example, after purification, contains 3.18% of methyl.

*Example 9.*—The process is conducted as in Example 6, but with the difference that, instead of the di-methyl sulphate, 1100 parts of di-ethyl sulphate are employed.

The ethyl cellulose produced by this example, after purification, contains 4.73% of the ethyl radical.

*Example 10.*—The process is conducted as in Example 6, but with the difference that, instead of the stated amounts of di-methyl sulphate, 600 parts of di-ethyl sulphate are employed. The ether after purification will contain about 4.31% of $C_2H_5$, or in other words, for each ethyl group there will be present in the ether about 3.54 $C_6H_{10}O_5$-molecular units of cellulose.

*Example 11.*—The process is conducted as in Example 10, but with the difference that, instead of 600 parts, 300 parts of di-ethyl sulphate are employed. The purified ethyl cellulose ether contains about 2.66% of ethyl group. This is one $C_2H_5$ group for about 5.73 $C_6H_{10}O_5$-molecular units of cellulose. The solubility of the product is substantially like the solubility of the methyl ether in Example 1.

*Example 12.*—The process is conducted as in Example 10, but with the difference that, instead of the di-ethyl sulphate, a mixture of 100 to 200 parts of di-methyl sulphate with 100 parts of di-ethyl sulphate are employed to give rise to the production of a mixed ether. This result can also be obtained by allowing two or three alkylating agents different in the alkyl groups contained therein, to act upon alkali cellulose in two or three consecutive steps, for example by adding 100 to 300 parts of di-ethyl sulphate to the reaction mass produced in any of the Examples 1 to 8 from the action of di-methyl sulphate upon alkali cellulose after the first 6 hours of shredding (3 hours in the absence and 3 hours in the presence of di-methyl sulphate), and kneading the reaction mass with the di-ethyl sulphate for another 3 hours.

In Examples 9, 10, 11 and 12 the crude reaction mass is only partly soluble in 10 per cent caustic soda solution, so that, in the event of the isolation of the ethyl cellulose in pure state being desired, the solutions should be filtered before being precipitated.

*Example 13.*—Mode of procedure as in any of the foregoing examples, but with the difference that, before being contacted with the di-methyl and/or di-ethyl sulphate, the alkali cellulose is allowed to mature for a short time, say 12 to 24 hours, or for a long time, say 24 to 60 hours at 15° C.

*Example 14.*—The process is conducted as in any one of the preceding examples, with the exception that, before addition of the di-methyl and/or di-ethyl sulphate, 20 parts of copper acetate dissolved in 30 parts of water are incorporated with the alkali cellulose.

The alkali cellulose used in any of Examples 1 to 14 may also be prepared by mixing the cellulose in a suitable mixing apparatus, for example, a kneading machine, a shredder, an edge mill or the like, with an amount of caustic soda solution equal (in amount and concentration) to that which remains in the soda cellulose in Example 1, after it has been pressed, and this alkali cellulose may be treated with the di-alkyl sulphate either immediately after the mixing process or after it has been allowed to stand for some time.

In the above examples the degree of pressing of the alkali cellulose may be varied as desired (for example it may be pressed to 2, 4 or 6 parts calculated on 1 part of the original cellulose).

Instead of bleached or unbleached cellulose, a conversion product of cellulose which is insoluble in alkalies may be used as the parent material (for instance a cellulose which has been hydrated or hydrolyzed by chemical action such as by mercerization with subsequent washing and, if necessary, drying; or by the action of a strong mineral acid; or by heating with a weak mineral acid; or by treatment with a zinc halide; or by a mechanical process, such as grinding in the presence of water, or the like; or an oxy-cellulose which is insoluble in alkalies), in short any body of the cellulose group which has been proposed for the manufacture of viscose or ammoniacal-copper-oxide-cellulose.

In the specification and the claims, wherever the context permits, the expression "cellulose" includes the above mentioned cellulosic bodies.

In the foregoing examples, instead of the dialkyl sulphates used therein other inorganic esters of mono-valent alcohols, for example methyl iodide or methyl bromide, or ethyl iodide or propyl iodide, etc., may be used. The halogen element of these esters, and the $SO_4$ radical of the dialkyl sulphates will hereinafter be termed "inorganic acid residue." The alkyl celluloses produced in the above examples all contain relatively low percentages of alkyl group. It will be observed that these products contain one alkyl group to several $C_6H_{10}O_5$-molecular units of cellulose. The following table shows (B) The amount and kind of alkylating agent used in the above examples (to 1000 parts of cellulose).

(C) The amount and kind of alkyl group in the ether obtained in the respective examples (after isolation and purification) as shown by actual analysis, and (D) The number of $C_6H_{10}O_5$-molecular units of cellulose per one alkyl group (this being computed from the data given in column C), in the purified ethers.

| Example | B | C | D |
|---|---|---|---|
| 1 | 600 $Me_2SO_4$ | 1.60% $CH_3$ | 5.35 |
| 5 | 300 $Me_2SO_4$ | 1.51% $CH_3$ | 5.6 |
| 6 | 100 $Me_2SO_4$ | 0.67% $CH_3$ | 12.7 |
| 6 | 200 $Me_2SO_4$ | 1.37% $CH_3$ | 6.5 |
| 7 | 1000 $Me_2SO_4$ | 2.96% $CH_3$ | 2.88 |
| 8 | 1500 $Me_2SO_4$ | 3.18% $CH_3$ | 2.68 |
| 9 | 1100 $Et_2SO_4$ | 4.73% $C_2H_5$ | 3.22 |
| 10 | 600 $Et_2SO_4$ | 4.31% $C_2H_5$ | 3.54 |
| 11 | 300 $Et_2SO_4$ | 2.66% $C_2H_5$ | 5.73 |

The following are some examples of utilization of the ethers made as described above.

*Example 15.*—100 parts of a methyl or ethyl ether of cellulose, prepared according to any one of the preceding examples, are dissolved in 900 to 1200 parts of a caustic soda solution of 5 to 8 per cent strength, while stirring, kneading or the like. This solution, after filtering if necessary, is distributed in the shape of a layer by means of a suitable hopper and coagulated by any precipitating bath known in the viscose art, for example a bath composed of sulphuric acid, a salt and an organic substance, such as sugar. The solidified film is thoroughly washed with water and dried. The continuous film may be treated before or after drying with an aqueous solution of glycerine (for instance, of 10 per cent strength), in order to increase its flexibility.

*Example 16.*—A solution prepared as in Example 15 is forced to enter through a fine orifice into a precipitating bath as referred to in Example 15 and the solidified thread which forms is thoroughly washed with water and dried. The artificial thread may be treated, either in the course of its manufacture or when completed, with a hardening agent such as formaldehyde or the like.

*Example 17.*—A mixture of 50 parts of viscose (prepared in the usual manner and containing 8 to 10 per cent by weight of cellulose), and 50 parts of a solution of a methyl or ethyl ether of cellulose prepared as in Example 15, is spun into artificial thread as described in Example 16.

*Example 18.*—Mode of procedure as in Example 16 or 17, but with the difference that sulphuric acid of 30–70 per cent. strength is used as coagulating bath and the spinning is performed in a manner similar to the methods described in U. S. Patents Nos. 1,683,199 and 16,683,200, and in British patent specification No. 274,690.

*Example 19.*—A woven fabric, such as cotton fabric, is provided by means of a suitable machine, such as a backfilling machine or a padding machine or a spreading machine, with one or more coatings of a solution, prepared as in Example 15 or 17, and is then dried. (When more than one coating is applied it is desirable to dry the material after the application of each coating.) After the material has been dried and if desired steamed for a short time, it is introduced into a precipitating or coagulating bath as referred to in Example 15 or 18, and is then washed and dried. The textile material may be treated before or after drying with a softening agent, such as a soap solution, an aqueous solution of Turkey-red oil, or an aqueous solution of glycerine.

The dressing on the fabric is fast or relatively fast to laundering and to dry-cleaning.

*Example 20.*—The procedure is as in Example 19, with the exception that there is added to the cellulose ether solution, a filling material, for instance, zinc-white, china clay, or talc.

*Example 21.*—The procedure is as in Example 19 or 20, with the exception that there is added to the cellulose ether solution a softening agent, such as a drying or non-drying oil, or a soap.

*Example 22.*—The procedure is as in Example 19, 20, or 21, with the exception that the cellulose ether solution is mixed with a solution of starch.

The expression "artificial structures" used in the specification and claims includes: artificial threads, particularly artificial silk; films; coatings and layers of every kind; dressings on textiles, paper, leather and the like; sizing on yarns, book cloth; artificial leather; articles comprising parts joined by adhesives and cements; plates and shaped plastic compositions in general; coatings comprising thickening agents or fixing agents for pigments in textile printing and the like.

An important advantage, inherent in the artificial structures produced according to the above examples, is the very high degree of flexibility and pliability and toughness of the products. As an illustration of this, a film of 0.05 millimeter thickness (made by coagulating a solution of an alkyl cellulose prepared in accordance with the present process, by means of a 25% ammonium sulphate solution or by a 10% sulphuric acid, or by a 10% solution of ammonium sulphate in dilute sulphuric acid, or by a solution of 100 parts of ammonium sulphate and 100 parts of glycerine in 800 parts of 10% sulphuric acid) can be bent double along the same line first in one direction and then in the opposite direction, in the well known "Schopper apparatus," at least 45 times (and in some cases even 75 times) without breaking. This is mentioned to show the extreme flexibility, pliability and toughness of the said products. Also another prominent difference between the properties of the alkyl celluloses made according to the present invention on the one hand, and the properties of alkali soluble alkyl celluloses made in accordance with the processes known heretofore on the other, is the much better dry tenacity, and particularly the wet tenacity and also the improved extensibility of the artificial structures produced from the alkyl cellulose made by the present process, as compared with the alkali soluble alkyl celluloses made by the processes known heretofore. This fact can be observed not only in the film but also in the artificial threads produced according to the present invention.

The term "artificial threads" denotes artificial threads and spun goods of all kinds, for instance artificial silk, staple fibre, artificial cotton, artificial wool, artificial hair and artificial straw of any kind.

The expression "strong mineral acids" denotes sulphuric acid of at least 35 per cent of $H_2SO_4$, preferably at least 45 per cent of $H_2SO_4$, and as regards the other mineral acids, solution of equivalent strength.

The expressions "strong sulphuric acid" or "sulphuric acid containing at least about 35 per cent of sulphuric acid monohydrate" denotes sulphuric acid having a content of 35 to 98 per cent of $H_2SO_4$.

As stated above, the alkylated derivatives, as produced in the present case, are soluble, to some extent at least, in caustic alkali solutions (e. g. 5 to 10% solutions of NaOH, or stronger solutions). The degree of such solubility is to some extent variable, depending on the details of the process by which the said alkylated derivatives have been produced. It is an inherent property of the cellulose ethers produced according to the present case, that they are easily dissolved in alkali solutions which are very cold, i. e. at near the freezing point of the alkali solution. Such solutions can then be warmed up to or even somewhat above room temperature without coagulating or gelatinizing. Usually the cellulose ethers produced according to the present case, do not directly dissolve in caustic alkali solution at room temperature. It is an inherent property of the solutions produced in the cold that when they warm up to room temperature, or to somewhat above room temperature, that they remain substantially clear, without forming a jelly. Note in this connection British Patent 212,864. In this British patent, see for instance page 3, lines 62 to 71, where the making of the solutions of alkali soluble cellulose ethers and esters in caustic alkali solutions by refrigeration is described for the first time.

The particular alkyl ethers of cellulose described in the present case, worked up into artificial structures, particularly films, threads, coatings of every kind, dressing on textiles, etc., by the process described herein, give artificial structures that (with regard to tensile strength in the dry and wet state, toughness, flexibility, elasticity, appearance, such as lustre, transparence, color, clearness, etc., and feel to the touch) are of most excellent quality.

The present application is in part a continuation of a copending application of this inventor, Serial No. 521,022, filed May 7, 1931.

The novel cellulose ethers and mode of producing same, as described herein, are claimed in a concurrently filed application Serial No. 314,359.

What is claimed is:

1. The process of producing adherent water insoluble dressing on fabrics with water insoluble ethyl cellulose which is dissolvable by dilute aqueous caustic soda solution at low temperatures near the freezing point thereof but not dissolvable by the same at ordinary room temperature, which comprises at least partially impregnating a cotton fabric with a dilute aqueous caustic alkali solution of said ethyl cellulose, and thereafter coagulating the ethyl cellulose on the fabric by exposure to an acid, such ethyl cellulose, when in the form of a film 0.05 millimeter thick, having a Schopper fold test of at least 45.

2. The process of producing adherent water insoluble dressing on fabrics with water insoluble lower alkyl cellulose which is dissolvable by dilute aqueous caustic soda solution at low temperatures approximating the freezing point but not dissolvable by the same at ordinary room temperature, which comprises impregnating a cotton fabric with a dilute aqueous caustic soda solution of said lower alkyl cellulose, and thereafter coagulating the lower alkyl cellulose on the fabric by exposure to an acid, such alkyl cellulose, when in the form of a film of 0.05 millimeter thickness, having a Schopper fold test of at least 45.

3. The process of producing adherent water insoluble dressing on fibrous textile materials with water insoluble lower alkyl cellulose which is dissolvable by dilute aqueous caustic alkali solution at low temperatures approximating the freezing point but not dissolvable by the same at ordinary room temperature, which comprises impregnating a fibrous textile material with a dilute aqueous caustic soda solution of said lower alkyl cellulose, and thereafter coagulating the lower alkyl cellulose on the fibrous textile material by exposure to an acid, such alkyl cellulose, when in the form of a film of 0.05 millimeter thickness, having a Schopper fold test of at least 45.

4. The process of producing adherent water insoluble dressing on fibrous textile material which comprises impregnating a fibrous textile material with a low substituted water insoluble lower alkyl cellulose dissolved in aqueous caustic soda solution of 5 to 8% strength, said alkyl cellulose being water insoluble and being undissolvable by dilute aqueous caustic soda solution at room temperature but dissolvable therein at temperatures approximating the freezing point and thereafter coagulating the said alkyl cellulose on the fibrous material by treatment with an acidic coagulant, such alkyl cellulose, when in the form of a film of 0.05 millimeter thickness, having a Schopper fold test of at least 45..

5. The process of producing adherent water insoluble dressing on fibrous textile materials which comprises applying to a fibrous textile material a dilute aqueous caustic alkali solution of a water insoluble lower alkyl cellulose and thereafter coagulating the lower alkyl cellulose on the fibrous textile material, the said alkyl cellulose being water insoluble and undissolvable by dilute aqueous caustic soda solution at ordinary room temperatures but dissolvable by aqueous caustic soda solution at temperatures near the freezing point thereof, such alkyl cellulose, when in the form of a film of 0.05 millimeter thickness, having a Schopper fold test of at least 45.

6. The process of producing adherent dressing on textiles which comprises impregnating the textile with a dilute aqueous caustic alkali solution of a water insoluble alkyl cellulose whose alkyl substituent contains not more than two carbon atoms, and thereafter coagulating the alkyl cellulose on the textile by treating the impregnated material with an acid, the said alkyl cellulose being of such degree of substitution that it is not dissolved by an aqueous caustic soda solution at ordinary room temperature but can be dissolved by an aqueous caustic soda solution at temperatures approximating the freezing point, such alkyl cellulose, when in the form of a film of 0.05 millimeter thickness, having a Schopper fold test of at least 45.

7. A fabric having an adherent water insoluble dressing of a low substituted water insoluble lower alkyl cellulose, said alkyl cellulose being water insoluble and not capable of directly dissolving in dilute aqueous caustic soda solution at room temperature but capable of being dissolved therein at temperatures approximating the freezing point, such alkyl cellulose, when in the form of a film of 0.05 millimeter thickness, having a Schopper fold test of at least 45.

8. A fabric having an adherent water insoluble dressing of a low substituted water insoluble lower alkyl cellulose, said lower alkyl cellulose being water insoluble and not being capable of directly dissolving in dilute aqueous caustic soda solution at room temperature but capable of being dissolved therein at temperatures approximating the freezing point, such alkyl cellulose, when in the form of a film of 0.05 millimeter thickness, having a Schopper fold test of at least 45.

9. A fabric having an adherent water insoluble dressing of a low substituted water insoluble ethyl cellulose, said ethyl cellulose being water insoluble and not being capable of dissolving directly in dilute aqueous caustic soda solution at room temperature but being capable of dissolving therein at temperatures approximating the freezing point, such ethyl cellulose, when in the form of a film 0.05 millimeter thick, having a Schopper fold test of at least 45.

10. A fibrous textile material having an adherent coating of a low substituted water insoluble lower alkyl cellulose, said alkyl cellulose being of such degree of alkylation that it is incapable of directly dissolving in dilute aqueous caustic soda solution at ordinary room temperatures but is capable of dissolving in dilute aqueous caustic soda solution at temperatures near the freezing point thereof, the said coating constituting a water insoluble dressing, such alkyl cellulose, when in the form of a film of 0.05 millimeter thickness, having a Schopper fold test of at least 45.

11. A process of making shaped artificial structures which comprises first reacting upon cellulose with an alkylating agent in the presence of water and caustic alkali, in the absence of extraneous heating, the said water being in an amount several times greater than the amount of said caustic alkali, to form an alkyl derivative of cellulose, dissolving said alkyl derivative of cellulose in an aqueous caustic alkali solution, giving such solution the shape of the artificial structure desired and subjecting the shaped solution to the action of a coagulating agent.

12. A fibrous textile material carrying, rigidly attached thereto, a dressing containing as its essential constituent, a low-alkyl cellulose ether which cellulose ether has the properties of a cellulose ether made by reacting upon cellulose with an alkylating agent in the presence of an alkali, and in the absence of extraneous heat, the amount of such alkali, calculated as NaOH, being only a minor fraction of the weight of the water present.

13. A shaped artificial structure composed in large part at least of a water-insoluble alkyl ether of cellulose which is soluble in caustic alkali solution, which alkyl ether is substantially identical with the alkyl ether produced by the process of impregnating 1000 parts of cellulose with an excess of 18% NaOH solution, letting stand for about three hours, pressing down to about 3400 parts, comminuting while at about 12-13° C., adding an alkylating agent selected from the group consisting of 100 to 1500 parts of dimethyl sulphate, 300 to 1100 parts of diethyl sulphate, and a mixture of 100 to 200 parts of dimethyl sulphate and 100 parts of diethyl sulphate, and allowing the said etherifying agent to act upon the alkali cellulose without applying extraneous heat to the mass, thereafter dissolving such etherified cellulose in aqueous caustic alkali solution, giving the solution the shape of the artificial structure desired and acting upon said so-shaped solution with a coagulating agent.

14. A mode of manufacture of a shaped artificial structure which comprises forming a solution in aqueous caustic alkali solution, of an alkali soluble alkyl derivative of cellulose which has been prepared by reacting with an alkylating agent, upon cellulose in the presence of a caustic alkali and water, the amount of said water being several times greater than the amount of said caustic alkali, said reaction being conducted in the substantial absence of extraneous heating, and said alkyl derivative containing, to each alkyl group, several $C_6H_{10}O_5$-molecular units of cellulose, giving to such solution the shape of an artificial structure desired, and coagulating said shaped solution.

15. A process which comprises acting upon alkali cellulose containing several times more water than caustic alkali, calculated as caustic soda, in the absence of extraneous heat, with an inorganic ester of a monovalent alcohol in amount substantially less than 1 mol of such inorganic ester per $C_6H_{10}O_5$-molecular unit of cellulose, to form a cellulose derivative in which a part only of the hydroxyl hydrogen atoms of the cellulose molecule is replaced by alkyl groups, and which is soluble in aqueous alkaline solutions but not readily soluble in water or alcohol, and which contain less than one alkyl group per two $C_6H_{10}O_5$-molecular units of cellulose, dissolving such partly alkylated products in a dilute aqueous alkali solution, and bringing such solution into the shape of the desired artificial structure and acting upon the same with a liquid which is a coagulant for viscose.

16. A process which comprises acting upon cellulose in the presence of an alkali, and containing several times more water than alkali, with dimethyl sulphate in amount less than 1 mol. of dimethyl sulphate to each $C_6H_{10}O_5$-molecular equivalent of cellulose, such action being effected without extraneous heating of the reaction mass, to form a partly methylated derivative of cellulose, soluble in aqueous alkaline solutions but substantially insoluble in water and in alcohol, which methylated derivative contains less than one methyl group per two $C_6H_{10}O_5$-molecular units of cellulose; dissolving said product in aqueous caustic alkali solution and bringing said solution into the shape of a desired artificial structure and into contact with an acid having a strength equivalent to sulphuric acid of at least 35 per cent.

17. Shaped artificial structures which contain as an essential constituent, an alkyl cellulose that is soluble in aqueous caustic alkali solution, but which is substantially insoluble in water, and composed essentially of an alkyl ether of cellulose which ether when in the form of a film of 0.05 m. m. in thickness, is capable of being bent double at least 45 times before breaking.

18. A film which contains as an essential constituent, an alkyl cellulose that is soluble in aqueous caustic alkali solution, but which is substantially insoluble in water, and which film has the same toughness and flexibility as a film 0.05 millimeter in thickness, having a Schopper fold test of at least 45.

19. A regenerated artificial thread which is composed, at least in its greater part, of an alkyl cellulose that is soluble in aqueous caustic alkali solution, but that is substantially insoluble in water and in the usual organic solvents of highly etherified cellulose ethers, and which has the toughness and flexibility represented by a Schopper fold test of at least 45.

20. A regenerated artificial thread which is composed, in large part at least, of an alkyl ether of cellulose that is soluble in aqueous caustic alkali solution, but which is substantially insoluble in water, and substantially insoluble in alcohol and in acetone, and which alkyl ether contains, per one alkyl group, several $C_6H_{10}O_5$-molecular units of cellulose, and which alkyl ether, in the form of a film 0.05 m. m. in thickness has a Schopper fold test of at least 45.

21. A shaped artificial structure which consists essentially of a methyl cellulose that is soluble in aqueous caustic alkali solution, but which is substantially insoluble in water, in alcohol and in acetone, and which methyl cellulose, when in the form of a film 0.05 millimeter in thickness, can be bent double at least 45 times without breaking.

22. A method for the manufacture of an artificial structure, which comprises bringing into the shape of the artificial structure desired, a solution in aqueous caustic alkali solution of an alkali soluble alkyl derivative of cellulose, and which alkyl derivative contains, per one alkyl group, several $C_6H_{10}O_5$-molecular units of cellulose and is substantially identical with an alkyl derivative made by acting upon cellulose in the presence of caustic alkali and water, with no extraneous heating of the reacting mass, with at least one di-alkyl sulphate, in which reaction mixture the amount of said water is several times greater than the amount of said caustic alkali, and acting upon such shaped solution with a coagulating agent.

23. A process of making artificial structures, as claimed in claim 22, wherein the coagulating agent contains not less than 50 per cent and not more than about 80 per cent of sulphuric acid monohydrate.

24. A process which comprises acting upon alkali cellulose containing substantially more water than caustic alkali, calculated as caustic soda, without extraneous supply of heat, with an amount of an alkyl ester of an inorganic acid which is less than 1 mol. of such ester to one $C_6H_{10}O_5$-molecular unit of cellulose, whereby an alkyl derivative of cellulose is formed in which a part only of the hydroxyl hydrogen atoms of the cellulose molecule is replaced by an alkyl group and which is soluble in aqueous caustic alkali solutions but not soluble to any substantial extent in water or alcohol, dissolving such ether in an aqueous caustic alkali solution, bringing the so produced solution into the shape of a desired artificial structure, and acting upon the same with an acid having a strength equivalent to sulphuric acid of at least 35 per cent strength.

25. A process which comprises acting upon cellulose in the presence of an alkali, and in the presence of water several times greater than the amount of said alkali, with di-methyl sulphate in amount less than 1 mol. of di-methyl sulphate to each $C_6H_{10}O_5$-molecular unit of cellulose, such action being effected without extraneous heating of the reaction mass, to form a partly methylated derivative of cellulose, soluble in aqueous alkaline solution but substantially insoluble in water and in alcohol; dissolving said product in aqueous caustic alkali solution and bringing said solution into the shape of a desired artificial structure and into contact with a coagulating agent.

26. A process which comprises acting on alkali cellulose containing substantially more water than caustic alkali, with an amount of a di-alkyl sulphate which is substantially less than 1 mol. of di-alkyl sulphate per $C_6H_{10}O_5$-molecular unit of cellulose, such action being effected without extraneous heating to form partly alkylated derivatives of cellulose soluble in aqueous caustic alkali solution but not in water or alcohol or acetone; dissolving such partly alkylated products in a dilute aqueous caustic alkali solution, and bringing such solution while unsupported upon a porous carrier which it can permeate, into the shape of a desired artificial structure, and into contact with a medium which has a coagulating effect on the shaped solution and plasticizing the freshly coagulated material.

27. Process for the manufacture of a regenerated structure composed essentially of an alkyl derivative of cellulose which is soluble in aqueous caustic alkali solution, but substantially insoluble in water, which process comprises acting upon cellulose without extraneous supply of heat with an alkylating agent in the presence of an amount of alkali substantially smaller than the weight of water present, whereby an alkyl derivative of cellulose is produced which is soluble in aqueous caustic alkali solution but not in water or in alcohol or in acetone, dissolving such alkyl derivative of cellulose in an aqueous caustic alkali solution, forming the solution into the shape of a desired artificial structure and acting thereupon with a coagulating agent.

28. Process for the manufacture of a regenerated shaped structure, consisting essentially of an alkyl derivative of cellulose which is soluble in aqueous caustic alkali solution, but substantially insoluble in water and in alcohol and in acetone, which process comprises acting upon cellulose without extraneous supply of heat with a di-alkyl sulphate in the presence of an amount of alkali which is only a minor fraction of the weight of water present, dissolving such alkyl derivative of cellulose in an aqueous caustic alkali solution, forming such solution into the shape of the desired structure and acting thereupon with a coagulating agent.

29. An artificial regenerated structure composed, in major part at least, of an alkyl ether of cellulose which is soluble in aqueous caustic alkali solution and containing, per one alkyl group, at least 2.68 but not over 12.7 $C_6H_{10}O_5$-molecular units of cellulose, which product has been made without extraneous heating during the etherification process.

30. An artificial regenerated structure composed, in major part at least, of an alkyl ether of cellulose which is soluble in aqueous caustic alkali solution and containing, per one alkyl group, at least 2.68 but not over 12.7 $C_6H_{10}O_5$-molecular units of cellulose, and which alkyl ether of cellulose, in the form of a film of 0.05 m. m. in thickness, has a Schopper fold test of at least 45.

31. An artificial shaped structure composed, in major part at least, of an alkyl ether of cellulose which contains about 2.68 to about 12.7 $C_6H_{10}O_5$-molecular units of cellulose, to one alkyl group, and which ether is soluble in aqueous caustic alkali solutions, in the cold, and which ether, in the form of a film 0.05 m. m. thick, has a Schopper fold test at least 45, and which ether has been made without supplying extraneous heat during the etherification reaction.

EMERICH HUNNA.
*Executor of the Last Will and Testament of Leon Lilienfeld, Deceased.*